(12) United States Patent
Lecornu et al.

(10) Patent No.: US 11,617,975 B2
(45) Date of Patent: Apr. 4, 2023

(54) SEPARATOR

(71) Applicant: Hydro international Ltd, Clevedon (GB)

(72) Inventors: Jeremy Paul Lecornu, Somerset (GB); Daniel Stuart Jarman, Somerset (GB)

(73) Assignee: Hydro International Ltd, Clevedon (GB)

( * ) Notice: Subject to any disclaimer, the term of this patent is extended or adjusted under 35 U.S.C. 154(b) by 0 days.

(21) Appl. No.: 17/071,404

(22) Filed: Oct. 15, 2020

(65) Prior Publication Data

US 2021/0121801 A1 Apr. 29, 2021

(30) Foreign Application Priority Data

Oct. 24, 2019 (GB) ...................................... 1915456

(51) Int. Cl.
*B01D 29/56* (2006.01)

(52) U.S. Cl.
CPC .......... *B01D 29/56* (2013.01); *B01D 2201/31* (2013.01)

(58) Field of Classification Search
CPC ...... B01D 36/04; C02F 1/38; C02F 2103/001; E03F 1/00
See application file for complete search history.

(56) References Cited

U.S. PATENT DOCUMENTS

2013/0206661 A1* 8/2013 Stein ...................... B01D 36/04
210/170.03

FOREIGN PATENT DOCUMENTS

| CN | 106693514 A | 5/2017 |
| DE | 102005044166 A1 | 9/2006 |

(Continued)

OTHER PUBLICATIONS

Aydin, M. Cihan, Mualla Öztürk, and Ahmet Yücel. "Experimental and numerical investigation of self-priming siphon side weir on a straight open channel." Flow Measurement and Instrumentation 45 (2015): 140-150. (Year: 2015).*

(Continued)

*Primary Examiner* — Bradley R Spies
(74) *Attorney, Agent, or Firm* — Honigman LLP

(57) ABSTRACT

A separator, for separating solids from a liquid, comprises a hydrodynamic separator, a first filtration device, a first backwash device, a second filtration device, and a second backwash device. The first filtration device comprises a first inlet at a first level for receiving at least a first portion of the liquid from the hydrodynamic separator, and a first filter for filtering the first portion of the liquid received via the first inlet. During filtration of the first portion of the liquid, the first portion of the liquid passes through the first filter away from the first inlet and a first portion of solids is retained by the first filter. The first filter is located between the first inlet and the first backwash device. The first backwash device is configured to alternately prevent and allow the passage of the first portion of the liquid through the first backwash device such that, when the passage of the first portion of the liquid through the first backwash device is prevented, the first portion of the liquid that has passed through the first filter passes back through the first filter toward the first inlet so as to remove the first portion of solids from the first filter. The second filtration device comprises a second inlet at a second level higher than the first level for receiving a second portion of the liquid from the hydrodynamic separator, and a second filter for filtering the second portion of the liquid received via the second inlet. During filtration of the second portion of the liquid, the second portion of the liquid passes through the second filter away from the second inlet, and a (Continued)

second portion of solids is retained by the second filter. The second filter is located between the second inlet and the second backwash device. The second backwash device is configured to alternately prevent and allow the passage of the second portion of the liquid through the second backwash device such that, when the passage of the second portion of the liquid through the second backwash device is prevented, the second portion of the liquid that has passed through the second filter passes back through the second filter toward the second inlet so as to remove the second portion of solids from the second filter.

15 Claims, 12 Drawing Sheets

(56)  References Cited

FOREIGN PATENT DOCUMENTS

| | | |
|---|---|---|
| EP | 0958021 A1 | 11/1999 |
| KR | 20110037243 A | 4/2011 |

OTHER PUBLICATIONS

Giorgio et al—DE 102005044166 A1 Machine Translation—2006 (Year: 2006).*
UK Combined Search and Examination Report for Application No. GB1915456.6 dated Apr. 20, 2020.
Extended European Search Report, Application No. 20202972.4, dated Mar. 4, 2021.

* cited by examiner

SEPARATOR

CROSS REFERENCE TO RELATED APPLICATION

This U.S. patent application claims priority to Great Britain Application No. GB1915456.6, filed on Oct. 24, 2019, the disclosure of which is considered part of the disclosure of this application and is hereby incorporated by reference in its entirety.

TECHNICAL FIELD

The present disclosure relates to a separator.

BACKGROUND

Separators comprising a filtration device and a backwash device are known. A liquid enters the filtration device, and solids contained within the liquid are retained by a filter. Filtered liquid passes through the filter before reaching the backwash device. The backwash device alternately prevents and allows the passage of the filtered liquid away from the filtration device. When the backwash device prevents the passage of filtered liquid, the filtered liquid passes back up through the filter so as to backwash the filter. When the backwash device allows the passage of filtered liquid, the filtered liquid is able to pass out of the separator. If the flow rate is not sufficiently high, the filter may filter the liquid for a long period of time without being backwashed by the backwash device. This can lead to the filter being blocked and the separator operating inefficiently.

It is therefore desirable to provide a separator that overcomes these issues.

SUMMARY

According to an aspect there is provided a separator for separating solids from a liquid, the separator comprising: a hydrodynamic separator; a first filtration device, the first filtration device comprising a first inlet at a first level for receiving at least a first portion of the liquid from the hydrodynamic separator and a first filter for filtering the first portion of the liquid received via the first inlet, wherein during filtration of the first portion of the liquid, the first portion of the liquid passes through the first filter away from the first inlet and a first portion of solids is retained by the first filter; a first backwash device, wherein the first filter is located between the first inlet and the first backwash device, wherein the first backwash device is configured to alternately prevent and allow the passage of the first portion of the liquid through the first backwash device such that, when the passage of the first portion of the liquid through the first backwash device is prevented, the first portion of the liquid that has passed through the first filter passes back through the first filter toward the first inlet so as to remove the first portion of solids from the first filter; a second filtration device, the second filtration device comprising a second inlet at a second level higher than the first level for receiving a second portion of the liquid from the hydrodynamic separator and a second filter for filtering the second portion of the liquid received via the second inlet, wherein during filtration of the second portion of the liquid, the second portion of the liquid passes through the second filter away from the second inlet and a second portion of solids is retained by the second filter; and a second backwash device, wherein the second filter is located between the second inlet and the second backwash device, wherein the second backwash device is configured to alternately prevent and allow the passage of the second portion of the liquid through the second backwash device such that, when the passage of the second portion of the liquid through the second backwash device is prevented, the second portion of the liquid that has passed through the second filter passes back through the second filter toward the second inlet so as to remove the second portion of solids from the second filter.

The first inlet may be defined by a first weir and the second inlet may be defined by a second weir. The first weir may be at the first level and the second weir may be at the second level.

The first filtration device may further comprise a baffle for impeding flow of the first portion of the liquid to the first inlet. The baffle may be spaced from the first weir so as to form a gap therebetween through which the first portion of the liquid is able to pass.

A lower edge of the baffle may be at a level that is higher than the first level and lower than the second level.

An upper edge of the baffle may be at a level that is higher than the second level.

The second weir may be spaced from the second filter.

The surface area of the second filter may be greater than the surface area of the first filter.

The porosity of the second filter may be greater than the porosity of the first filter.

The first filtration device may comprise a first base spaced from the first filter. The second filtration device may comprise a second base spaced from the second filter. A first collection chamber may be defined between the first base and the first filter. A second collection chamber may be defined between the second base and the second filter. The distance between the second base and the second filter may be greater than the distance between the first base and the first filter.

The first filtration device may comprise a first cylindrical side wall defining a first collection chamber. The second filtration device may comprise a second cylindrical side wall defining a second collection chamber. The diameter of the second cylindrical side wall may be greater than the diameter of the first cylindrical side wall.

The first filtration device may comprise a first spillway exiting the first filtration device. The second filtration device may comprise a second spillway exiting the second filtration device. The cross-sectional area of the second spillway may be greater than the cross-sectional area of the first spillway.

The first backwash device may be a first siphon and the second backwash device may be a second siphon.

A level of an inlet to the first siphon may be spaced from a level of an outlet from the first siphon by a first distance. A level of an inlet to the second siphon may be spaced from a level of an outlet from the second siphon by a second distance. The second distance may be greater than the first distance.

The level of the inlet to the second siphon may be below the level of the inlet to the first siphon.

The first siphon may comprise a first crest and the second siphon may comprise a second crest. The level of the second crest may be higher than the level of the first crest.

BRIEF DESCRIPTION OF THE DRAWINGS

Embodiments will now be described by way of example only, with reference to the Figures, in which.

DETAILED DESCRIPTION

Figure 1:
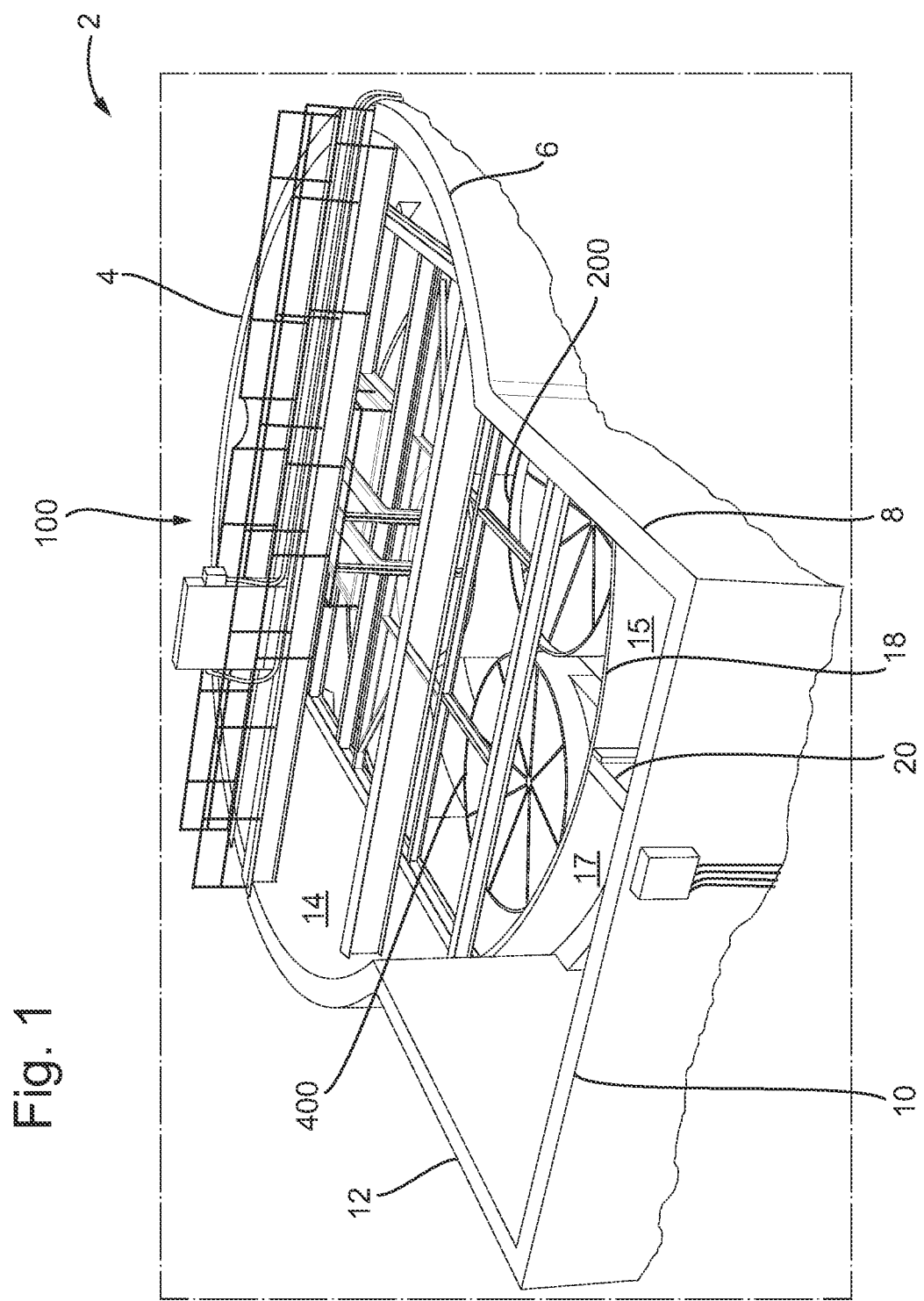
FIG. 1 is a perspective view of a separator.

FIG. 1 shows a separator 2 for separating solids from a liquid. The separator 2 comprises a vessel 4 within which a hydrodynamic separator 100, a first filtration device or solids interceptor 200, a first backwash device 300, a second filtration device or solids interceptor 400 and a second backwash device 500 are disposed. The first and second backwash devices 300, 500 are not shown in FIG. 1. The vessel 4 comprises a first side wall 6, a second side wall 8, a third side wall 10 and a fourth side wall 12. The first side wall 6 is substantially cylindrical and the second, third and fourth side walls 8, 10, 12 are substantially planar. The first side wall 6 partly defines a main chamber 14 and the second, third and fourth side walls 8, 10, 12 partly define a first overflow chamber 15 and a second overflow chamber 17. The main chamber 14 is separated from the first and second overflow chambers 15, 17 by a first dividing wall 18. The first overflow chamber 15 is separated from the second overflow chamber 17 by a second dividing wall 20. The hydrodynamic separator 100 and the first and second filtration devices 200, 400 are disposed in the main chamber 14. The first backwash device 300 and the second backwash device 500 are disposed in the first overflow chamber 15 and the second overflow chamber 17, respectively.

Figure 2:
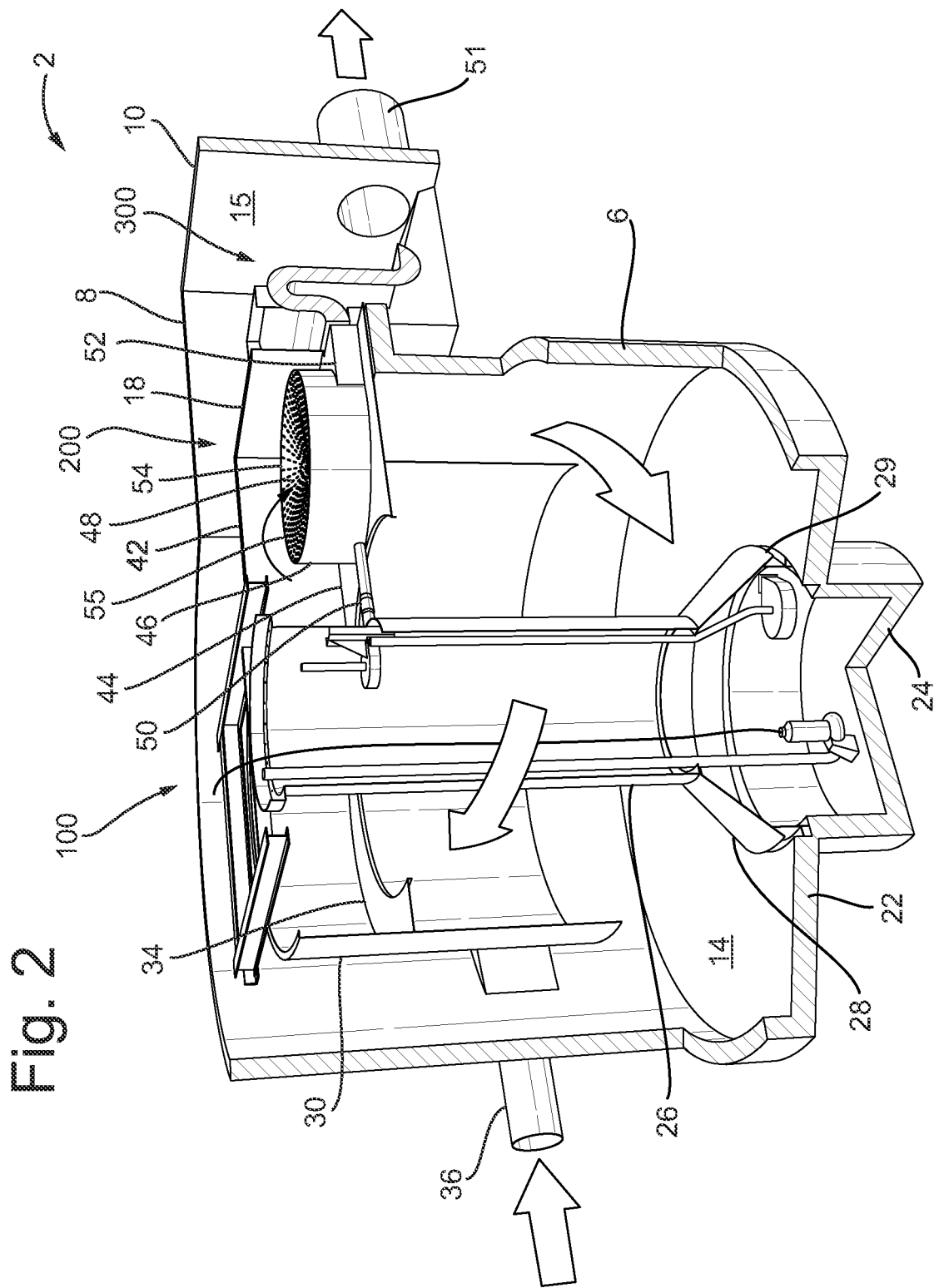
FIG. 2 is a cutaway perspective view of the separator.

FIG. 2 shows the interior of the separator 2. The second dividing wall 20, the second overflow chamber 17, the second filtration device 400 and the second backwash device 500 are not shown, for clarity. A tangential inlet 36 extends through the first side wall 6. The first side wall 6 is connected to a base 22 that slopes downwards in a radially inward direction to a sump 24. A hollow column 26 and a dip plate 30 extend downward from an upper region of the vessel 4. A lower end of the column 26 is connected to a hollow conical body 28. An annular gap 29 is formed between the lower end of the hollow conical body 28 and the base 22. The annular gap 29 acts as an inlet to the sump 24. The dip plate 30 has a generally cylindrical profile. The lower end of the dip plate 30 is spaced from the base 22. The dip plate 30 is spaced from the first side wall 6 so as to form an outer annular passageway therebetween, and is spaced from the column 26 so as to form an inner annular passageway therebetween. An annular baffle 34 extends in a radially inward direction from the inner surface of the dip plate 30. The inner edge of the annular baffle 34 is spaced from the column 26. A portion 44 of the annular baffle 34 extends in a radially outward direction to the first dividing wall 18. A pair of side walls 42 (only one of which is shown in FIG. 2) extend in a radially outward direction from the dip plate 30 to the curved wall 18.

The first filtration device 200 comprises a first base 45 (not shown in FIG. 2), a first cylindrical side wall 46, a first filter or screen 48, a first duct 50 and a first spillway 52. The first base 45 is formed by the radially extending portion 44 and is horizontal. The first cylindrical wall 46 extends upwards from the first base 45. An upper edge of the first cylindrical wall 46 defines a first weir 54. The first weir 54 defines a first inlet 55 into the first filtration device 200. The first filter 48 slopes downwards in a radially inward direction to an opening of the first duct 50. Accordingly, the first filter 48 has a frustoconical profile. The first filter 48 has a plurality of openings for allowing the passage of water but preventing the passage of solids above a certain size. The first base 45 is spaced from the first filter 48. A first liquid collection chamber 58 (not shown in FIG. 2) is defined between the first base 45, the first cylindrical wall 46 and the first filter 48. The first duct 50 extends through the first liquid collection chamber 58 and exits out of the first cylindrical wall 46. The first spillway 56 exits the first liquid collection chamber 58 and extends outwardly to a first opening 60 (not shown in FIG. 2) in the cylindrical wall 46.

The first backwash device 300 is in the form of a first siphon. The first filter 48 is located between the first inlet 55 and the first siphon 300 (i.e. the first inlet 55, the first filter 48 and the first siphon 300 are disposed in flow series). A first outlet 51 exits the first overflow chamber 15. The first siphon 300 extends between the second side wall 8 and the second dividing wall 20 such that fluid must pass through it to get to the first outlet 51. Although not shown, the second overflow chamber 17 substantially corresponds to the first overflow chamber 15 and a second outlet exits the second overflow chamber 17 in a corresponding manner to the first outlet 51. The second siphon 500 extends between the fourth side wall 12 and the second dividing wall 20 such that fluid must pass through it to get to the second outlet.

Figure 3:
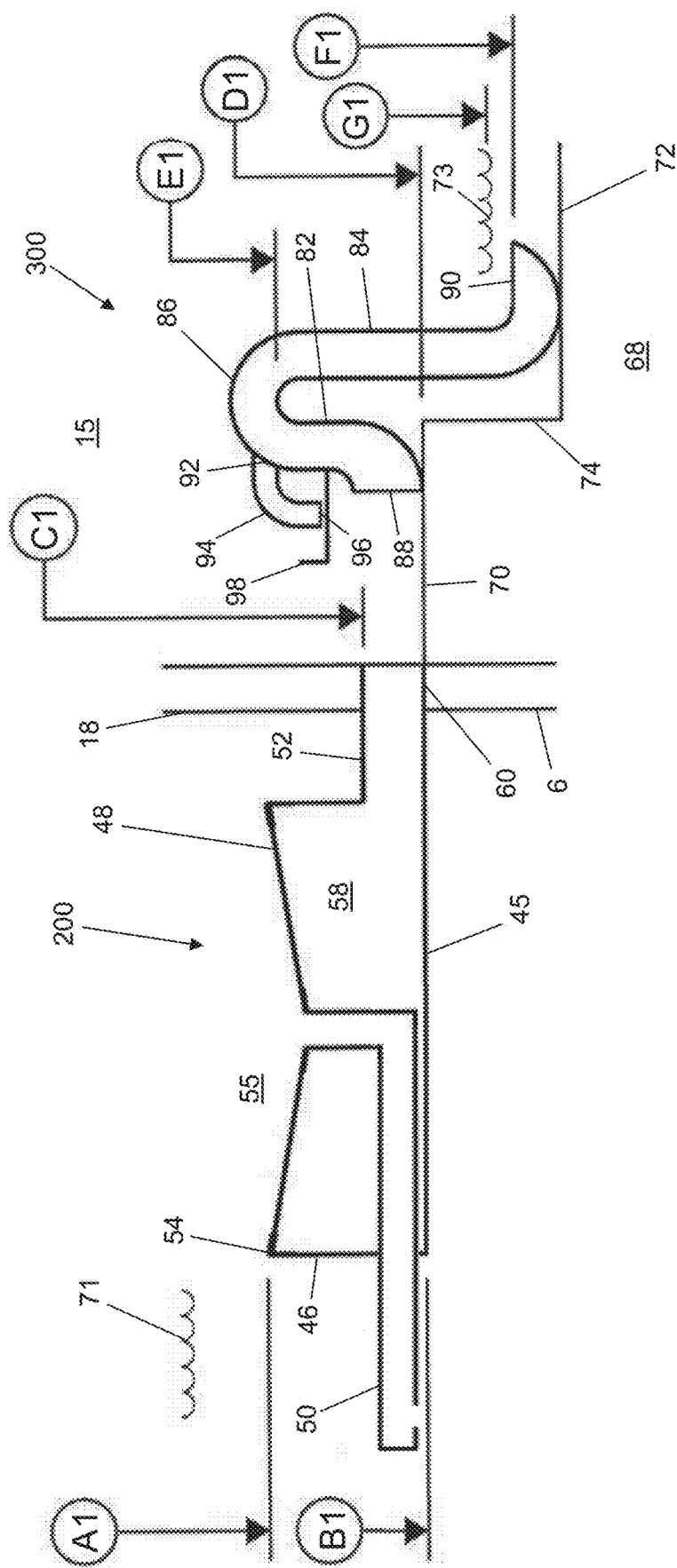
FIG. 3 is a cross-sectional schematic side view a first filtration device and a first backwash device of the separator.

FIG. 3 is a side view showing the first overflow chamber 15, the first filtration device 200 and the first siphon 300. The first overflow chamber 15 comprises a first base 68 formed of a first upper surface 70, a first lower surface 72 and a first step 74. The first siphon 300 comprises an upward tube portion 82, a downward tube portion 84 and a connecting tube portion 86. The upward and downward tube portions 82, 84 are substantially vertical. The first connecting tube portion 86 connects upper ends of the upward and downward tube portions 82, 84 and forms a first crest. A lower end of the upward tube portion 82 and a lower end of the downward tube portion 84 form a first inlet 88 and a first outlet 90, respectively. The first inlet 88 and the first outlet 90 are positioned adjacent the first upper surface 70 and the first lower surface 72, respectively. The first inlet 88 is higher than the first outlet 90. The first siphon 300 is provided with a first air break inlet 92 above the first inlet 90. A first air break pipe 94 is connected to the first air break inlet 92. An inlet 96 to the air break pipe 94 is located in a first open topped box 98 positioned above the first inlet 88.

The first inlet 55 and the first weir 54 are positioned at a first level A1. The first base 45 is at a level B1. The upper surface of the first spillway 52 is at a level C1. The first inlet 88 to the first siphon 300 is at a level D1. The first crest 86 is at a level E1. The first outlet 90 is at a level F1. The maximum downstream water level 73 is at a level G1.

During operation of the separator 2, a liquid comprising water and solids (i.e. a liquid-solid mixture) is introduced into the vessel 4 via the tangential inlet 36. The liquid circulates around the outer annular passageway and passes up along the inner annular passageway. The circulating liquid is low energy. A stabilized shear zone is created in the circulating liquid between an outer, relatively fast circulating region and an inner, relatively slowly circulating region. In particular, a shear zone is created between the bottom edge of the dip pate 30 and a bottom edge of the conical body 28. A portion of the solids within the liquid settles under the force of gravity onto the upper surface of the base 22. An inward sweeping effect caused by the flow within the vessel 4 forces solids accumulated on the base 22 through the annular gap 29 and into the sump 24.

Operation of the first filtration device 200 and the first siphon 300 is described with reference to FIGS. 4A to 4E.

Figure 4A:
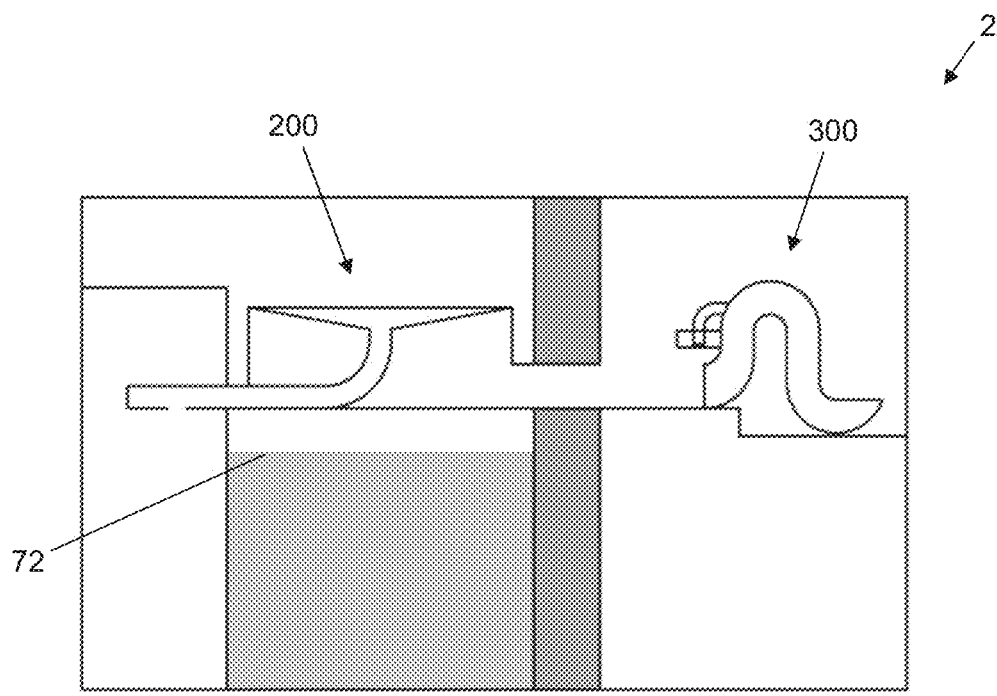
FIG. 4A is a cross-sectional schematic side view of the first filtration device and the first backwash device during a first stage of operation.

FIG. 4A shows the first filtration device 200 and the first siphon 300 after liquid entering the vessel 4 via the tangential inlet 36 has passed up along the inner annular passageway and reached a level 72 below the first filtration device 200.

Figure 4B:
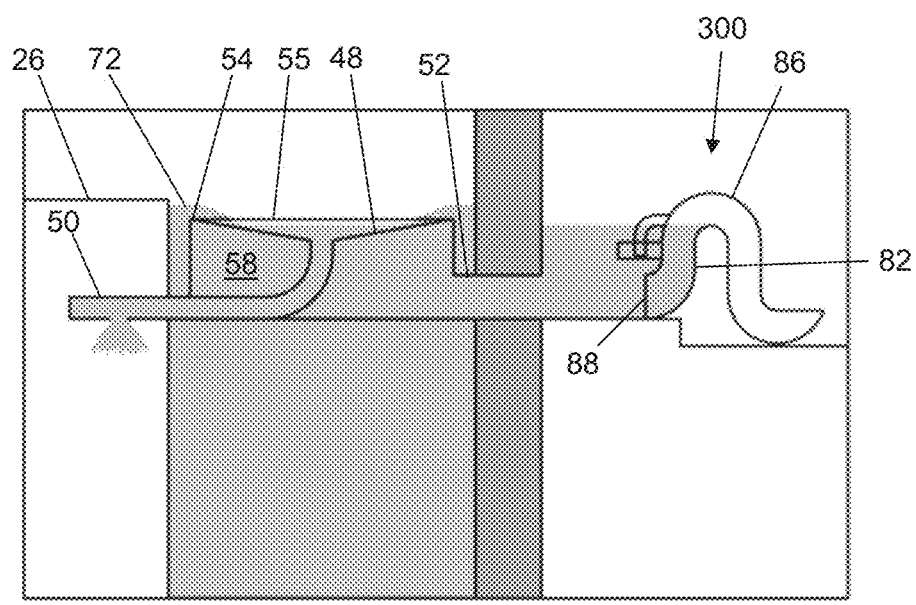
FIG. 4B is a cross-sectional schematic side view of the first filtration device and the first backwash device during a second stage of operation.

The liquid continues to enter the vessel 4 via the tangential inlet 36. FIG. 4B shows the separator 2 after the level 72 of the liquid has increased above the level of the first inlet 55 formed by the first weir 54. A first portion of the liquid flows into the first filtration device 200 via the first inlet 55 by passing over the first weir 54. The liquid then passes onto the first filter 48. A first portion of solids contained within the liquid are unable to pass through the first filter 48, and, thus, are retained by the first filter 48. A further portion of solids may pass along the first filter 48, into the first outlet pipe 50, down the column 26 and into the sump 24. Filtered liquid passes through the first filter 48, away from the first inlet 55 and into the first liquid collection chamber 58. The filtered liquid then passes through the first spillway 52, into the first inlet 88 of the first siphon 300 and up the upward tube portion 82. In FIG. 4B, the liquid within the upward tube portion 82 has not reached the level of the first crest 86.

Figure 4C:
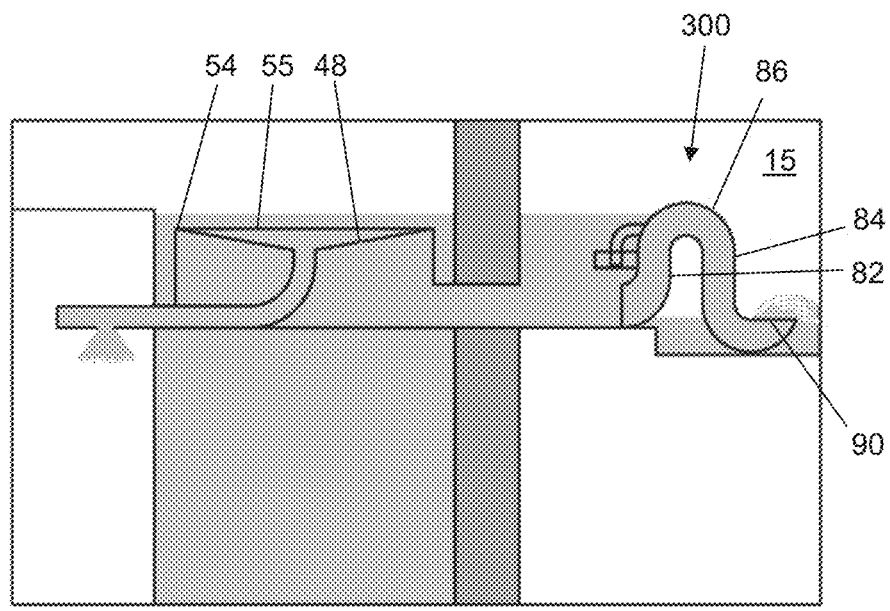
FIG. 4C is a close-up cross-sectional schematic view of the first filtration device and the first backwash device during a third stage of operation.

The liquid continues to enter the vessel 4 via the tangential inlet 36. The liquid continues to flow into the first filtration device 200 via the first inlet 55 by passing over the first weir 54 and filtered liquid continues to pass through the first filter 48. FIG. 4C shows the separator 2 after the liquid within the upward tube portion 82 has reached the level of the first crest 86 and has passed along the downward tube portion 84, thereby priming the first siphon 300. Liquid passing through the first siphon 300 exits the outlet 90 of the siphon 300 into the first overflow chamber 15, and passes out of the first overflow chamber 15 via the first outlet 51. The maximum water level 71 at peak flow is shown in FIG. 3.

Figure 4D:
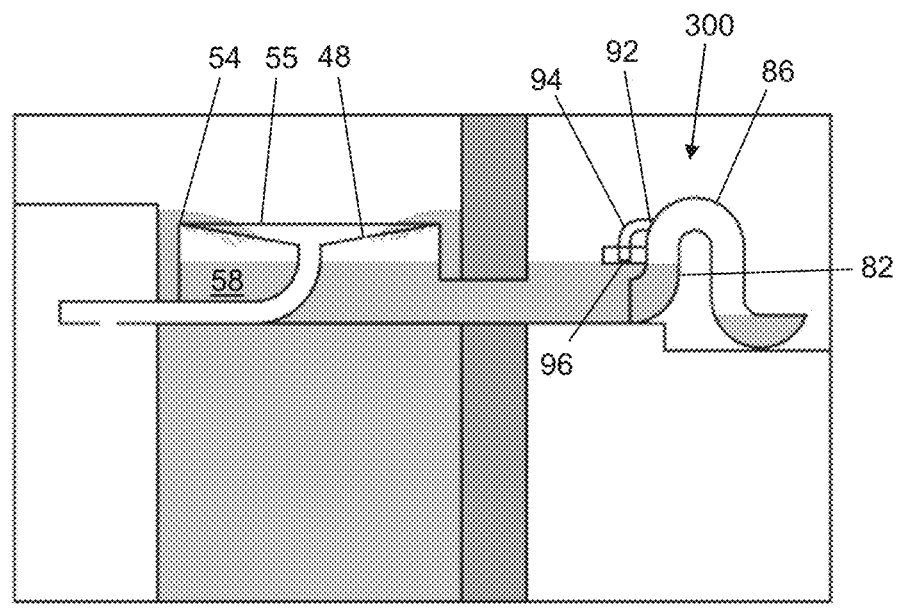
FIG. 4D is a cross-sectional schematic side view of the first filtration device and the first backwash device during a fourth stage of operation.

Once the first siphon 300 is primed, the flow rate of filtered liquid through the first siphon 300 is greater than the flow rate of liquid through the first filter 48 away from the first inlet 55. Accordingly, the level of filtered liquid within the first liquid collection chamber 58 decreases. FIG. 4D shows the separator 2 after the level of filtered liquid within the first liquid collection chamber 58 has decreased below the first filter 48. The level of filtered liquid upstream of the first siphon 300 has decreased to the level of the inlet 96 to the first air break pipe 94. Accordingly, air is drawn into the inlet 96 of the first air break pipe 94, passes along the air break pipe 94 and exits into the crest 86. Once sufficient air has accumulated within the first crest 86, the siphon effect within the first siphon 300 is broken.

Figure 4E:
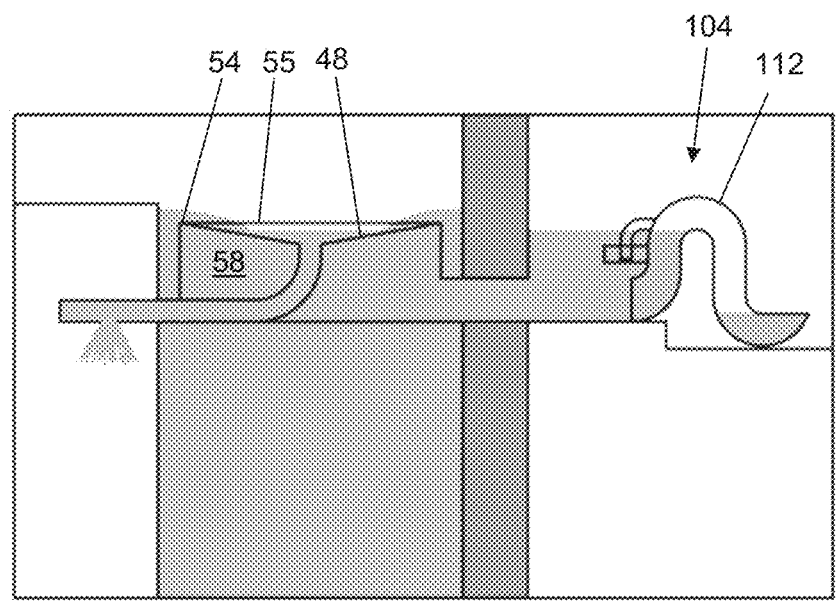
FIG. 4E is a cross-sectional schematic side view of the first filtration device and the first backwash device during a fifth stage of operation.

With the first siphon 300 no longer being primed, the level of filtered water within the liquid collection chamber 58 begins to rise. The first portion of liquid that has passed through the first filter 48 passes back through the first filter 48 toward the first inlet 55. FIG. 4E shows the separator 2 during this process. As the filtered water rises up through the first filter 48 it dislodges the solids collected on the first filter 48, thereby unblocking the first filter 48 and allowing its continued efficient operation. This process is referred to as backwashing.

While the liquid continues to enter into the vessel 4 via the tangential inlet 36, the first siphon 300 continues to automatically cycle between the stages described above with reference to FIGS. 4B to 4E. The first siphon 300 therefore alternately prevents and allows the passage of liquid therethrough so as to alternately raise and lower the level of the liquid within the first liquid collection chamber 58, thereby backwashing the first filter 48 and maintaining the first filtration device 200 in good working order.

Figure 5:
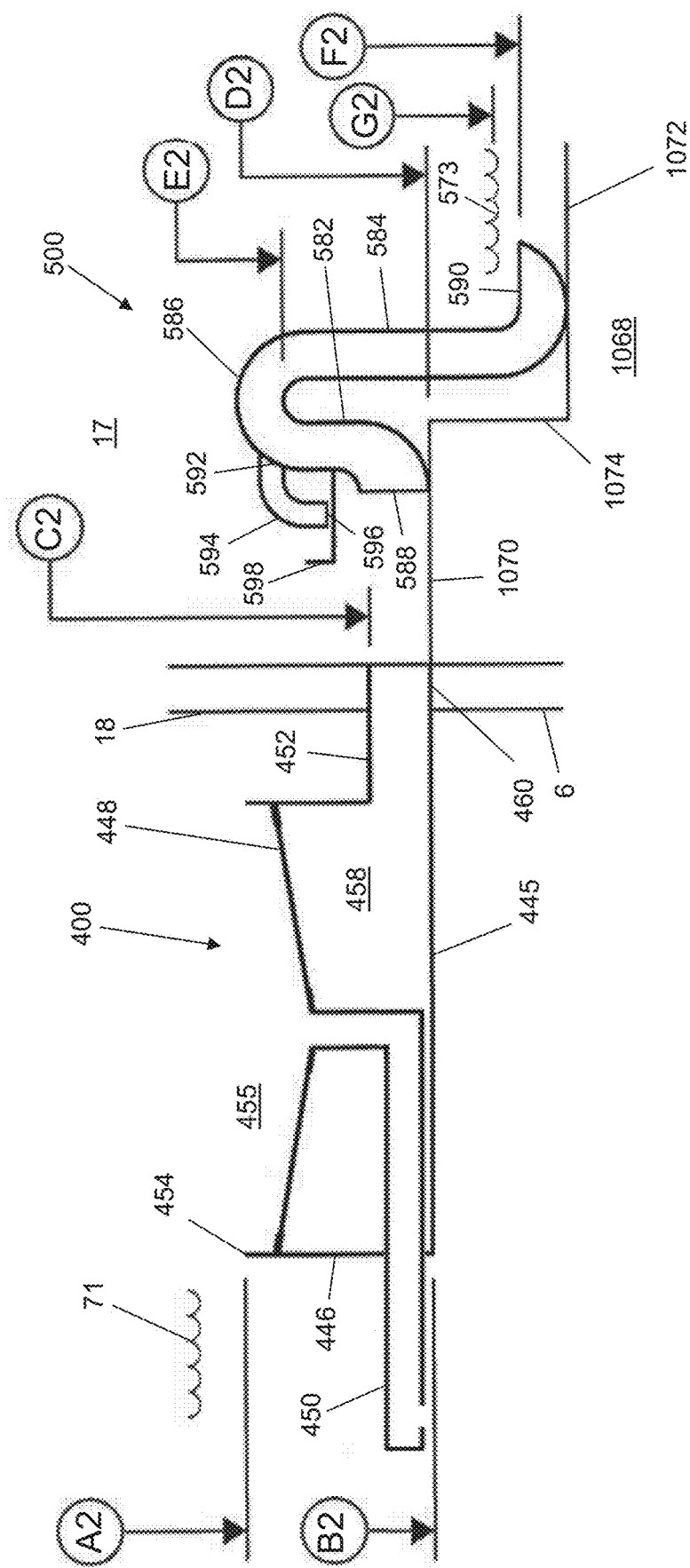
FIG. 5 is a cross-sectional schematic side view of a second filtration device and a second backwash device of the separator.

FIG. 5 is a side view showing the second overflow chamber 17, the second filtration device 400 and the second backwash device 500. As with the first backwash device 300, the second backwash device 500 is in the form of a siphon. The second filtration device 400 substantially corresponds to the first filtration device 200. The reference numerals used to denote the features of the second filtration device 400 correspond to those used to denote corresponding features of the first filtration device 200, with the addition of a value of 400. The second siphon 500 corresponds to the first siphon 300. The reference numerals used to denote the features of the second siphon 500 correspond to those used to denote corresponding features of the first siphon 300, with the addition of a value of 500. The second overflow chamber 17 corresponds to the first overflow chamber 15. The reference numerals used to denote the features of the second overflow chamber 17 correspond to those used to denote corresponding features of the first overflow chamber 15, with the addition of a value of 1000.

The second inlet 455 and the second weir 454 of the second filtration device 400 are positioned at a second level A2. The second base 445 is at a level B2. The upper surface of the second spillway 452 is at a level C2. The second inlet 588 of the second siphon 500 is at a level D2. The second crest 586 is at a level E2. The second outlet 590 is at a level F2. The maximum downstream water level 573 is at a level G2.

The second filtration device 400 and the second siphon 500 function in a similar manner to the first filtration device 200 and the first siphon 300. However, the second filtration device 400 differs from the first filtration device 200 in that the second weir 454, and, thus, the second inlet 455, are at a second level A2 that is higher than the first level A1 (i.e. higher relative to the horizontal). This has the effect that, during low flow conditions (e.g. 25% of peak flow), the liquid that passes up along the inner annular passageway is able to enter into the first filtration device 200 via the first inlet 55 by passing over the first weir 54, but is not able to enter into the second filtration device 400 via the second inlet 455 by passing over the second weir 454. Accordingly, flow is prioritized to the first filtration device 200. Since all of the liquid that passes up along the inner annular passageway is directed to first filtration device 200 and the first backwash device 300, the first filtration device 200 and the first backwash device 300 are able to function as described previously to regularly (i.e. periodically) and consistently backwash the first filter 48 even during low flow conditions. Since no flow is directed to the second filtration device 400, solids do not collect on the second filter or screen 448 of the second filtration device 400. Accordingly, even during sustained periods of low flow conditions, both the first filter 48 of the first filtration device 200 and the second filter 448 of the second filtration device 400 are maintained in good working order.

In the arrangement shown in FIG. 5, the second filter 448 is at the same level as the first filter 48. Accordingly, the distance between the second base 445 and the second filter 448 is equal to the distance between the first base 45 and the first filter 48. The difference in height between the second weir 454 and the first weir 54 is achieved by extending the cylindrical wall 446 of the second filtration device 400 upwards by a greater extent than the cylindrical wall 46 of the first filtration device 200. Accordingly, the second weir 454 is spaced in an upward direction from the second filter 448.

During high flow conditions, the first filtration device 200 and the first backwash device 300 continue to function as described previously to regularly backwash the first filter 48. In addition, a second portion of the liquid that passes up along the inner annular passageway also enters into the second filtration device 400 via the second inlet 455 by passing over the second weir 454. The second filtration device 400, the second backwash device 500 and the second overflow chamber 17 function in a similar manner to the first filtration device 200, the first backwash device 300 and the first overflow chamber 15. Accordingly, during high flow conditions the second filter 448 filters the second portion of liquid whilst being regularly and periodically backwashed.

The flow path through the second filtration device 400 and the second backwash device 500 is separate from the flow path through the first filtration device 200 and the first backwash device 300. Accordingly, the second filtration device 400 and the second backwash device 500 operate independently of the first filtration device 200 and the first backwash device 300.

The arrangement of the separator 2 ensures that both the first filter 48 and the second filter 448 are periodically backwashed when required. In particular, both the first filter 48 and the second filter 448 are regularly and periodically backwashed during high flow conditions and the first filter 48 is regularly and periodically backwashed during low flow conditions.

Figure 6:
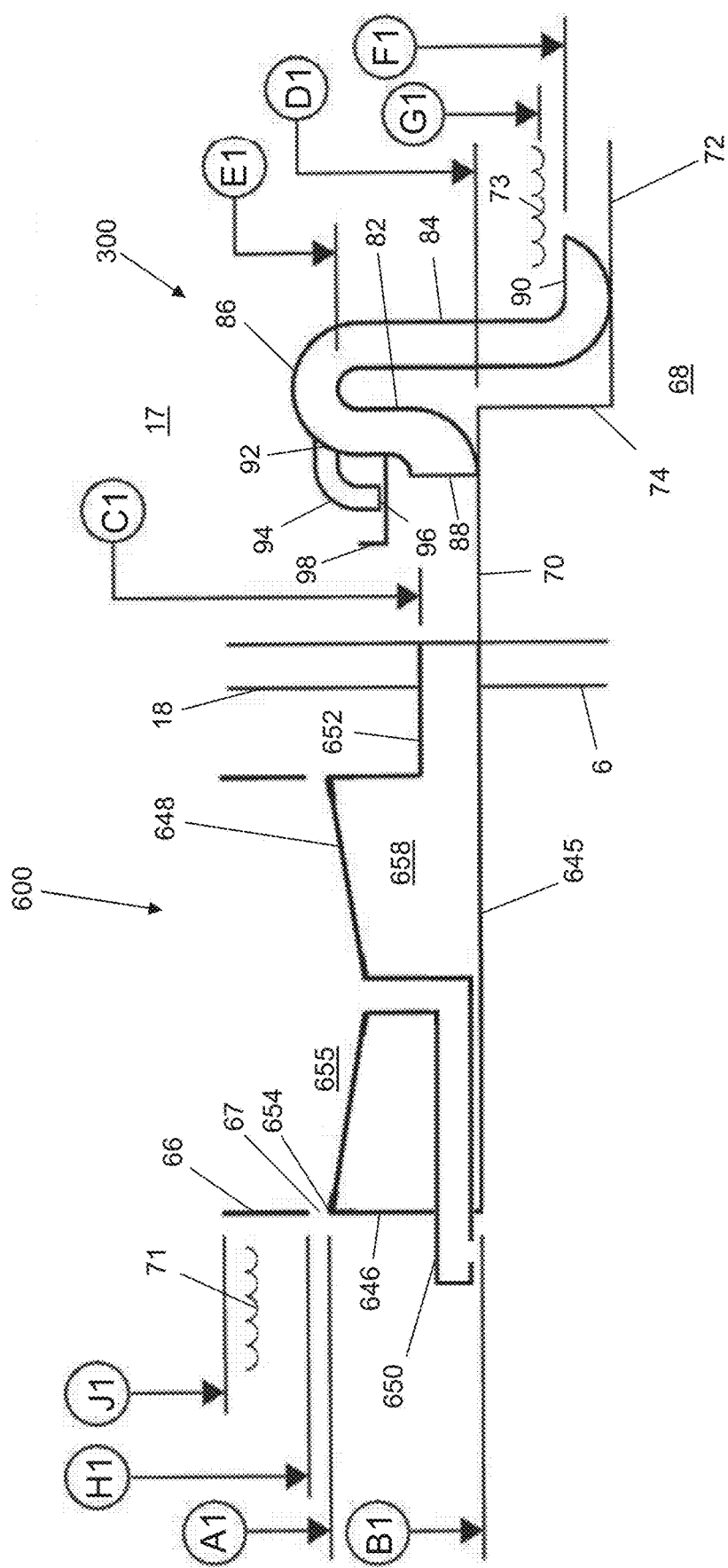
FIG. 6 is a cross-sectional schematic side view of an alternative first filtration device and the first backwash device of the separator.

FIG. 6 shows an alternative first filtration device 600. The alternative first filtration device 600 substantially corresponds to the first filtration device 200. The reference numerals used to denote the features of the alternative first filtration device 600 correspond to those used to denote corresponding features of the first filtration device 200, with the addition of a value of 600. The alternative first filtration device 600 differs from the first filtration device 200 in that it additionally comprises a baffle 66. The baffle 66 is annular (i.e. cylindrical) and is upwardly spaced from the first weir 654 such that a gap 67 is formed between the first weir 654 and the baffle 66 through which the first portion of liquid may pass. The first weir 654 may be referred to as a letterbox weir. The lower edge of the baffle 66 is at a level H1 and the upper edge of the baffle 66 is at a level J1. The alternative first filtration device 600 functions in a similar manner to the first filtration device 200. However, during high flow conditions, the baffle 66 impedes (but does not completely prevent) flow of the first portion of liquid to the first inlet 655. The gap 67 can be sized such that the alternative first filtration device 600 operates in the manner described previously with reference to FIG. 4A to 4E during both low flow conditions and high flow conditions.

Figure 7:
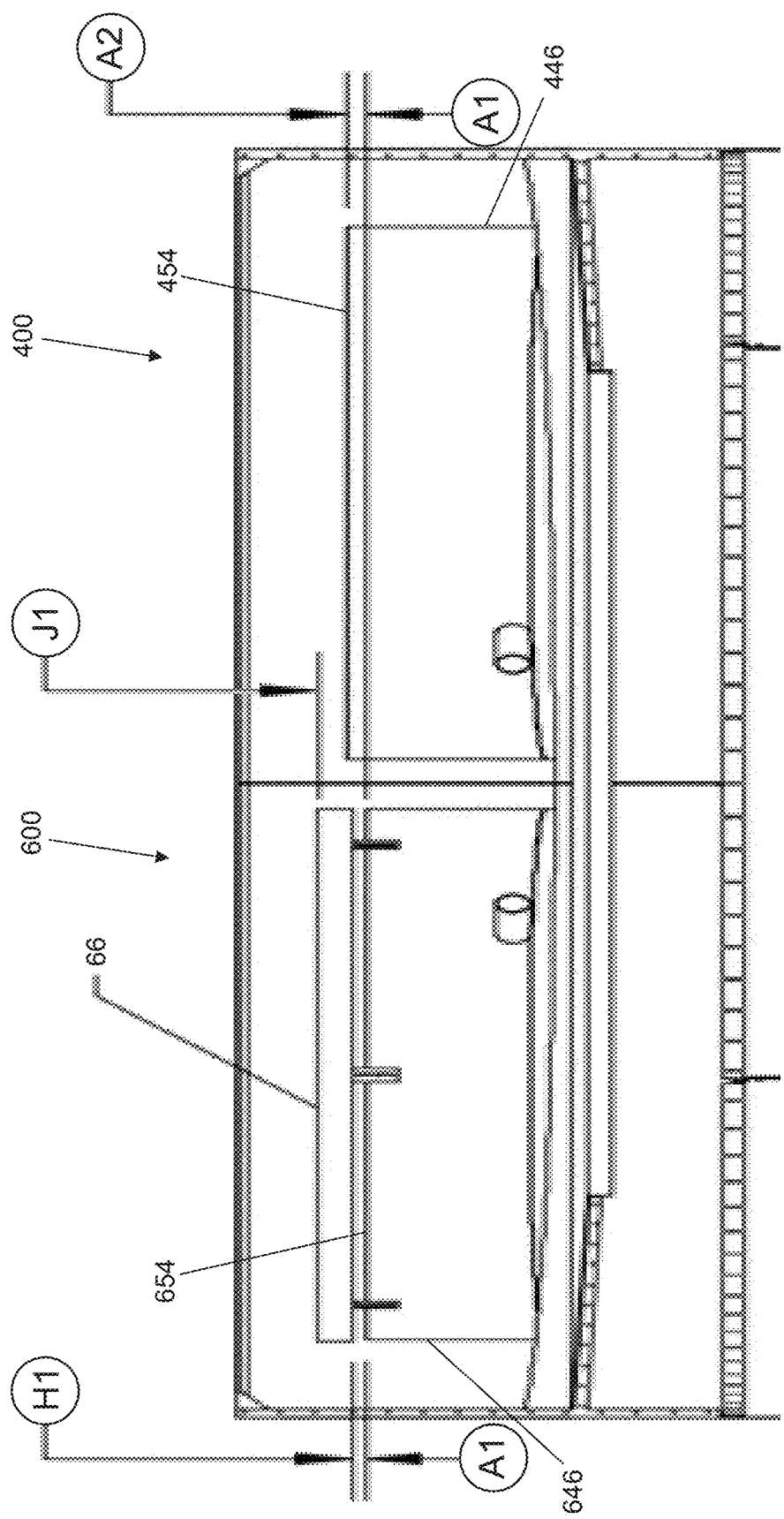
FIG. 7 is a cross-sectional side view of a separator comprising the alternative first filtration device and the second filtration device.

FIG. 7 is a side view of a separator 2 comprising the alternative first filtration device 600 and the second filtration device 400. As shown, the second level A2 of the second weir 454 is higher than the first level A1 of the first weir 654. The level H1 of the lower edge of the baffle 66 is lower than the second level A2 of the second weir 454. The level J1 of the upper edge of the baffle 66 is higher than the second level A2 of the second weir 454.

Figure 8:
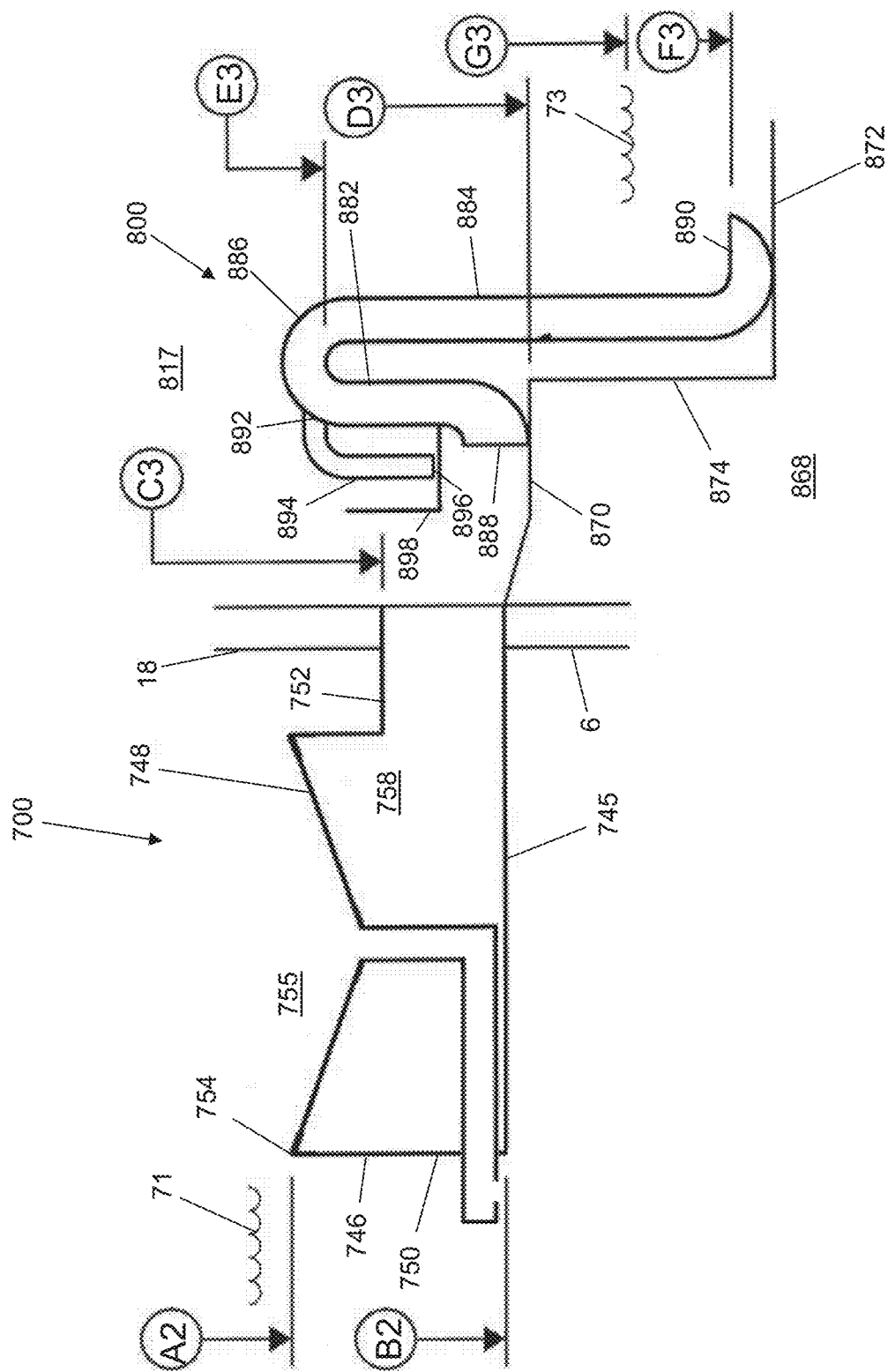
FIG. 8 is a cross-sectional schematic side view of an alternative second filtration device and an alternative second backwash device of the separator.

FIG. 8 shows an alternative second filtration device 700, an alternative second backwash device 800 and an alternative second overflow chamber 817. The alternative second filtration device 700 substantially corresponds to the second filtration device 400. The reference numerals used to denote the features of the alternative second filtration device 700 correspond to those used to denote corresponding features of the second filtration device 400, with the addition of a value of 300. The alternative second backwash device 800 substantially corresponds to the second backwash device 500. The alternative second backwash device 800 is in the form of a siphon. The reference numerals used to denote the features of the alternative second siphon 800 correspond to those used to denote corresponding features of the second siphon 500, likewise with the addition of a value of 300. The alternative second overflow chamber 817 substantially corresponds to the second overflow chamber 17. The reference numerals used to denote the features of the alternative second overflow chamber 817 correspond to those used to denote corresponding features of the second overflow chamber 17, with the subtraction of a value of 200. The alternative second siphon 800 is disposed in the alternative second overflow chamber 817.

The second weir 754 of the alternative second filtration device 700 is at a second level A2. The second base 745 is at a level B2. The upper surface of the second spillway 752 is at a level C3. The second inlet 888 to the alternative second siphon 800 is at a level D3. The second crest 886 is at a level E3. The second outlet 590 is at a level F3. The maximum downstream water level 573 is at a level G3.

The second filter 748 of the alternative second filtration device 700 is at a higher level than the first filter 48 of the first filtration device 200 or the first filter 648 of the alternative first filtration device 600. Accordingly, the distance between the second base 745 and the second filter 748 is greater than the distance between the first base 45 and the first filter 48 of the first filtration device 200 or the distance between the first base 645 and the first filter 648 of the alternative first filtration device 600. The second weir 754 is formed by an outer periphery of the second filter 748 and is therefore not spaced from the second filter 748.

The level C3 of the upper surface of the second spillway 752 of the alternative second filtration device 700 is higher than the level C1 of the upper surface of the first spillway 52 of the first filtration device 200 or the upper surface of the first spillway 652 of the alternative first filtration device 600. The lower surfaces of the spillways are at the same level.

Accordingly, the cross-sectional area of the interior of the second spillway 752 is greater than the cross-sectional area of the interior of the first spillways 52, 652.

The distance between the upper surface 870 and the lower surface 872 of the alternative second overflow chamber 817 is greater than the distance between the upper surface 70 and the lower surface 72 of the first overflow chamber 15.

The alternative second overflow chamber 817 differs from the second overflow chamber 17 in that the upper surface 870 of the second base 868 of the alternative second overflow chamber 817 is recessed in a downward direction. The second inlet 888 of the alternative second backwash device 800 is disposed on the recessed portion of the upper surface 870 such that the level D3 of the inlet 888 to the alternative second backwash device 800 is below the level D1 of the inlet 88 to the first backwash device 300 and below the level B2 of the base 745.

The level E3 of the crest 886 of the alternative second backwash device 800 is higher than the level E1 of the crest 86 of the first backwash device 300.

The distance between the level D3 of the inlet 888 to the alternative second backwash device 800 and the level F3 of the outlet 890 from the alternative second backwash device 800 is greater than the distance between the level D1 of the inlet 88 of the first backwash device 300 and the level F1 of the outlet 90 from the first backwash device 300. The distance between the level D3 of the inlet 888 of the alternative second backwash device 800 and the maximum downstream water level G3 is greater than the distance between the level D1 of the inlet 88 of the first backwash device 300 and the maximum downstream water level C1. The level F3 of the outlet 890 of the alternative second backwash device 800 is below the level F1 of the outlet 90 of the first backwash device 300.

The abovementioned differences result in the volume between the second filter 748 and the second crest 886 being greater than the volume between the first filter (e.g. the first filter 48 or the first filter 648) and the first crest 86. Accordingly, the capacity of the second filtration device and the second backwash device is greater than the capacity of the first filtration device and the first backwash device. The abovementioned differences also have the effect of increasing the flow rate through the alternative second backwash device 800 when primed. Accordingly, the alternative second filtration device 700, the alternative second backwash device 800 and the alternative second overflow chamber 817 are better able to handle high flow rates.

Figure 9A:
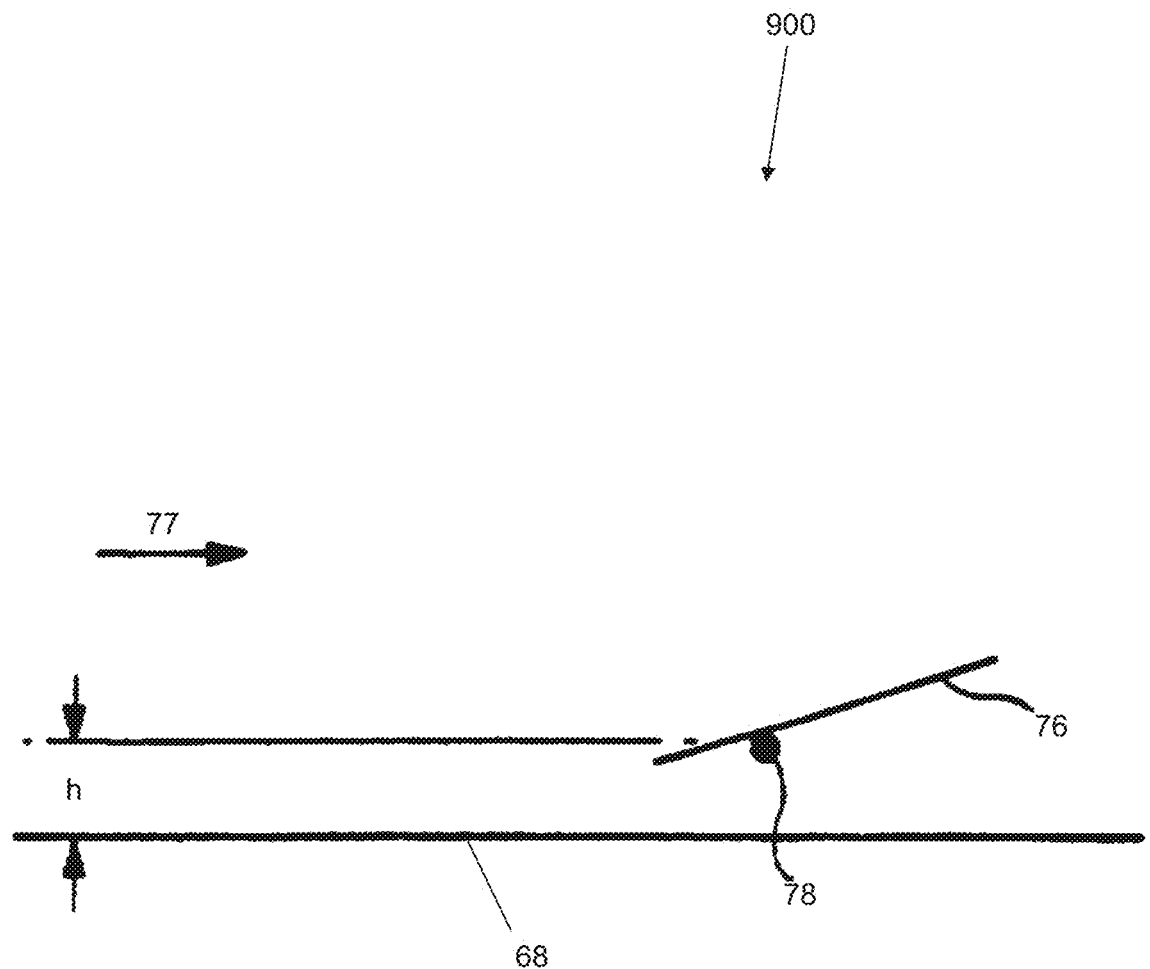
FIG. 9A is a cross-sectional schematic view of a further alternative backwash device during a first stage of operation.

FIG. 9A is a cross-sectional schematic view of a further alternative first backwash device 900 during a first stage of operation. The further alternative first backwash device 900 may be used instead of each the first backwash devices referred to previously. The further alternative first backwash device 900 is positioned in the first overflow chamber 15. The further alternative backwash device 900 comprises a flap 76 that extends between the second side wall 8 and the second dividing wall 20. The flap 76 is pivotally mounted in an eccentric manner to the second side wall 8 and the second dividing wall 20 about an axle 78. When there is no liquid outflow 77 from the hydrodynamic separator 100, the flap 76 is biased to the position shown in FIG. 9A. The flap 76 may be biased to the position shown in FIG. 9A as a result of one or more of the position of the eccentric pivot 78, the flap 76 being spring loaded or the flap 76 being provided with counterbalancing weights.

Figure 9B:
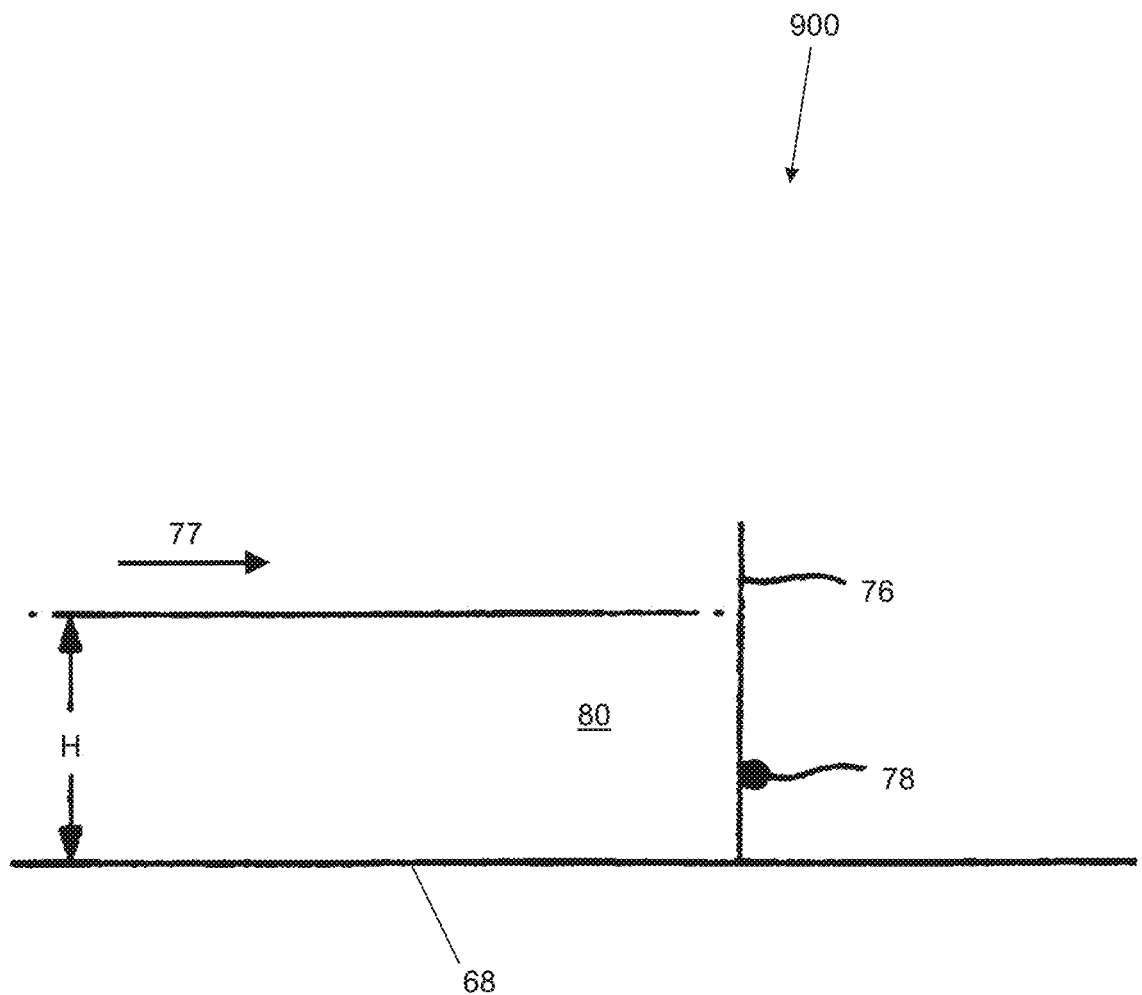
FIG. 9B is a cross-sectional schematic view of the further alternative backwash device during a second stage of operation.

FIG. 9B show the further alternative first backwash device 900 after the liquid flow rate 77 has increased. As shown, the additional pressure on the lower end of the flap 76 caused by the liquid flow 77 causes it to pivot in an anticlockwise direction. When the flap 76 is in the position shown in FIG. 9B, liquid builds up in the region 80 upstream of the flap. When the liquid level reaches a height H, the pressure of the liquid on the upper end of the flap 76 will be sufficient to rotate the flap 76 in a clockwise direction, back to the position shown in FIG. 9A. The liquid level will then fall until it reaches height h, at which point the flap will rotate back to the position shown in FIG. 9B. The flap 76 therefore alternately prevents and allows the passage of the liquid in a similar manner to the siphons described previously, thereby backwashing the first filter.

The second chamber is also provided with a further alternative second backwash device substantially corresponding to the further alternative first backwash device 900. The further alternative second backwash device functions in the same manner as the further alternative first backwash device 900.

In the abovementioned arrangements, the diameter of the cylindrical walls of the first filtration devices and the diameter of the cylindrical walls of the second filtration devices are the same. However, in alternative arrangements, the diameter of the cylindrical wall of the second filtration device may be greater than the diameter of the cylindrical wall of the first filtration device.

In the abovementioned arrangements, the area of the first filters and the area of the second filters are the same. However, in alternative arrangements, the area of the second filter may be greater than the area of the first filter. The angle formed between the second filter and the horizontal may be greater than the angle formed between the first filter and the horizontal. Accordingly, the vertical extent of the second filter may greater than the vertical extent of the first filter.

In the abovementioned arrangements, the porosity of the first filters and the porosity of the second filters are the same. However, in alternative arrangements, the porosity of the second filters may be greater than the porosity of the first filters.

In the abovementioned arrangements, inlets into the first and second filtration devices are formed by weirs that extend around the entirety of the filtration devices. However, this need not be the case. In alternative arrangements, the weir may only extend part way around the filtration devices. Alternatively, the inlets may be formed by one or more openings in the cylindrical wall of the first or second filtration devices, for example. In such arrangements the weir may be the lower edges of the one or more enclosed openings.

In the above arrangements, the cross-sectional areas of the flow paths defined by the first siphon and the second siphon are substantially equal. However, in alternative arrangements, the cross-sectional area of the flow path defined by second siphon may be greater than the cross-sectional area of the flow path defined by the first siphon. This increase in cross-sectional area may be achieved by increasing the spacing between a lower face of the second siphon and an upper face of the second siphon, for example.

It has been described that the separator comprises a single hydrodynamic separator, two filtration devices and two backwash devices. However, it will be appreciated that the separator may comprise more than two hydrodynamic separators and more than two corresponding filtration devices. In such arrangements, at least two of the hydrodynamic separators and their corresponding filtration devices operate in the manner described above.

It will be appreciated that the alternative first filtration device 600 may be used in place of the first filtration device 200, that, additionally or alternatively, the alternative second backwash device 800 may be used in place of the second backwash device 500 and that, additionally or alternatively, the alternative second overflow chamber 817 may be used in place of the second overflow chamber 17. It will be appreciated that a first filtration device, a second filtration device, a first backwash device, a second backwash device, a first overflow chamber or a second overflow chamber having a different combination of the features described above may be used in place of the specific arrangements described herein, and that the abovementioned arrangements are only exemplary. By way of example, the arrangement shown in FIG. 5 could have an upper surface 1070 that is recessed in the manner described with reference to FIG. 8.

The invention claimed is:

1. A separator for separating solids from a liquid, the separator comprising:
   a hydrodynamic separator;
   a first filtration device, the first filtration device comprising a first inlet at a first level for receiving at least a first portion of the liquid from the hydrodynamic separator during a first period of time and a first filter for filtering the first portion of the liquid received via the first inlet, wherein during filtration of the first portion of the liquid, the first portion of the liquid passes through the first filter away from the first inlet and a first portion of solids is retained by the first filter;
   a first backwash device, wherein the first filter is located between the first inlet and the first backwash device, wherein the first backwash device is configured to alternately prevent and allow the passage of the first portion of the liquid through the first backwash device during the first period of time such that, when the passage of the first portion of the liquid through the first backwash device is prevented, the first portion of the liquid that has passed through the first filter passes back through the first filter toward the first inlet so as to remove the first portion of solids from the first filter;
   a second filtration device, the second filtration device comprising a second inlet for receiving a second portion of the liquid from the hydrodynamic separator during the first period of time and a second filter for filtering the second portion of the liquid received via the second inlet, wherein during filtration of the second portion of the liquid, the second portion of the liquid passes through the second filter away from the second inlet and a second portion of solids is retained by the second filter; and
   a second backwash device, wherein the second filter is located between the second inlet and the second backwash device, wherein the second backwash device is configured to alternately prevent and allow the passage of the second portion of the liquid through the second backwash device during the first period of time such that, when the passage of the second portion of the liquid through the second backwash device is prevented, the second portion of the liquid that has passed through the second filter passes back through the second filter toward the second inlet so as to remove the second portion of solids from the second filter,
   wherein the second inlet is at a second level higher than the first level such that during a second period of time:
      the first inlet does receive the first portion of the liquid from the hydrodynamic separator and the first backwash device does alternately prevent and allow the passage of the first portion of the liquid through the first backwash device; and
      the second inlet does not receive the second portion of the liquid from the hydrodynamic separator and the second backwash device does not alternately prevent and allow the passage of the second portion of the liquid through the second backwash device.

2. A separator as claimed in claim 1, wherein the first inlet is defined by a first weir and the second inlet is defined by a second weir, wherein the first weir is at the first level and the second weir is at the second level.

3. A separator as claimed in claim 2, wherein the first filtration device further comprises a baffle for impeding flow of the first portion of the liquid to the first inlet, wherein the baffle is spaced from the first weir so as to form a gap therebetween through which the first portion of the liquid is able to pass.

4. A separator as claimed in claim 3, wherein a lower edge of the baffle is at a level that is higher than the first level and lower than the second level.

5. A separator as claimed in claim 3, wherein an upper edge of the baffle is at a level that is higher than the second level.

6. A separator as claimed in claim 2, wherein the second weir is spaced from the second filter.

7. A separator as claimed in claim 1, wherein the surface area of the second filter is greater than the surface area of the first filter.

8. A separator as claimed in claim 1, wherein the porosity of the second filter is greater than the porosity of the first filter.

9. A separator as claimed in claim 1, wherein the first filtration device comprises a first base spaced from the first filter and the second filtration device comprises a second base spaced from the second filter, wherein a first collection chamber is defined between the first base and the first filter, wherein a second collection chamber is defined between the second base and the second filter, and wherein the distance between the second base and the second filter is greater than the distance between the first base and the first filter.

10. A separator as claimed in claim 1, wherein the first filtration device comprises a first cylindrical side wall defining a first collection chamber and the second filtration device comprises a second cylindrical side wall defining a second collection chamber, wherein the diameter of the second cylindrical side wall is greater than the diameter of the first cylindrical side wall.

11. A separator as claimed in any claim 1, wherein the first filtration device comprises a first spillway exiting the first filtration device and the second filtration device comprises a second spillway exiting the second filtration device, wherein the area of the second spillway is greater than the area of the first spillway.

12. A separator as claimed in claim 1, wherein the first backwash device is a first siphon and the second backwash device is a second siphon.

13. A separator as claimed in claim 12, wherein a level of an inlet to the first siphon is spaced from a level of an outlet from the first siphon by a first distance, wherein a level of an inlet to the second siphon is spaced from a level of an outlet from the second siphon by a second distance, wherein the second distance is greater than the first distance.

14. A separator as claimed in claim 13, wherein the level of the inlet to the second siphon is below the level of the inlet to the first siphon.

15. A separator as claimed in claim 12, wherein the first siphon comprises a first crest and the second siphon comprises a second crest, wherein the level of the second crest is higher than the level of the first crest.

* * * * *